(12) United States Patent
Bergamini et al.

(10) Patent No.: US 12,264,944 B2
(45) Date of Patent: Apr. 1, 2025

(54) SYSTEM FOR MEASURING THE ROTATION OF A VEHICLE THROTTLE KNOB

(71) Applicant: DOMINO S.R.L., Sirtori (IT)

(72) Inventors: Elio Ivano Bergamini, Monza (IT); Luca Lamparelli, Carate Brianza (IT)

(73) Assignee: DOMINO S.R.L., Sirtori (IT)

( * ) Notice: Subject to any disclaimer, the term of this patent is extended or adjusted under 35 U.S.C. 154(b) by 94 days.

(21) Appl. No.: 18/167,494

(22) Filed: Feb. 10, 2023

(65) Prior Publication Data
US 2023/0288228 A1 Sep. 14, 2023

(30) Foreign Application Priority Data

Feb. 14, 2022 (IT) .......................... 102022000002654

(51) Int. Cl.
| | | |
|---|---|---|
| *G01D 5/14* | (2006.01) | |
| *B62J 45/413* | (2020.01) | |
| *B62K 23/04* | (2006.01) | |
| *G01B 7/30* | (2006.01) | |

(52) U.S. Cl.
CPC ............ *G01D 5/145* (2013.01); *B62J 45/413* (2020.02); *G01B 7/30* (2013.01); *B62K 23/04* (2013.01)

(58) Field of Classification Search
CPC ......... B63H 20/08; B63H 20/10; B63H 20/02
See application file for complete search history.

(56) References Cited

U.S. PATENT DOCUMENTS

| | | |
|---|---|---|
| 4,499,420 A | 2/1985 | Shiraki et al. |
| 9,905,964 B2 * | 2/2018 | Degner ............. H01R 13/6315 |
| 2005/0162157 A1 | 7/2005 | Kamizino et al. |
| 2007/0001058 A1 * | 1/2007 | Severson ............... A63H 19/24 246/1 R |
| 2008/0114523 A1 | 5/2008 | Dugas et al. |
| 2010/0265176 A1 * | 10/2010 | Olsson .................... G06F 3/016 345/161 |
| 2015/0004856 A1 * | 1/2015 | Grez ...................... B63H 20/08 440/85 |
| 2017/0253267 A1 * | 9/2017 | Woodruff ................. B62D 3/06 |
| 2018/0309047 A1 * | 10/2018 | Sasioglu ............. H01F 10/3268 |
| 2020/0393270 A1 | 12/2020 | Delbaere et al. |

FOREIGN PATENT DOCUMENTS

| | | |
|---|---|---|
| EP | 2507592 B1 | 1/2019 |
| WO | 2011066969 A1 | 6/2011 |

OTHER PUBLICATIONS

European Search Report for Corresponding European Patent Application No. EP23156232.3, Jun. 19, 2023, 7 pages.
Italian Search Report for Corresponding Italian Patent Application No. 202200002654, 8 pages, Sep. 9, 2022.

* cited by examiner

*Primary Examiner* — Jermele M Hollington
*Assistant Examiner* — Temilade S Rhodes-Vivour
(74) *Attorney, Agent, or Firm* — LUCAS & MERCANTI, LLP

(57) ABSTRACT

A system for measuring the rotation of a throttle knob of a vehicle such as a motorcycle, snowmobile, personal watercraft or the like is disclosed, including a knob fitted onto a handlebar and capable of rotating around it. The knob has a magnet, provided for a fixed sensor suitable to detect the angular movement of the magnet following a rotation of the knob for the vehicle throttle control. The magnet has two sectors (N, S) with opposite polarity and different length, with the magnet therefore having asymmetric polarities.

8 Claims, 4 Drawing Sheets

SYSTEM FOR MEASURING THE ROTATION OF A VEHICLE THROTTLE KNOB

FIELD OF THE INVENTION

Forming an object of the present invention is a system for measuring the rotation of an accelerator or throttle knob of a vehicle such as a motorcycle, a snowmobile or a personal watercraft or the like, according to the attached claims.

BACKGROUND OF THE INVENTION

There are known various systems for enabling a rider to control, remotely and without physical connection, the fuel supply to the engine of a vehicle such as for example a motorcycle so as to change the power generated (and therefore change the acceleration imparted to the vehicle). Such systems, usually indicated as the "drive-by-wire" type, provide for the use of control units, usually a microprocessor (or "electronic control units"), which receive signals from one or more sensors for example associated with the accelerator knob ("throttle knob") of the vehicle and control usual engine components to change the generated power.

In the motorcycling industry, there is known the use of magnets applied to the throttle or accelerator knob whose angular movement around the handlebar on which it is arranged is detected by a sensor (usually, a Hall effect sensor) integrally joined with the handlebar. This enables the electronic control unit of the vehicle connected to such sensor to determine the intention of the rider to change the acceleration of the motorcycle. Following such detection, said control unit controls the fuel supply to the engine to change the power thereof or the number of revolutions in a known manner.

For example, EP2507592 describes a throttle knob having an arrangement of sensors suitable to detect the movement of a part of the throttle or accelerator knob carrying a magnet. Such arrangement comprises a Hall effect sensor integrally joined with a fixed part of the knob (or with a part of the handlebar onto which the knob is fitted) and connected to the electronic control unit. The detection, by the aforementioned sensor, of the displacement of the magnet with respect to an initial position enables such sensor to detect how much the rider wants to accelerate, which is then translated—by the control unit or electronic control unit—into a corresponding command to change the engine power.

EP250792 describes and claims that the magnet is precisely divided into three segments, each with its own north pole and its own south pole, something which—as described—enables to determine, although with a very slight rotary movement of the magnet, for example by just 90°, a very ample angular change (up to 360° C.) of the knob part to which the magnet is associated, a change which is recorded by the sensor and which the electronic control unit may correctly interpret as the acceleration command, very precisely.

Although operating effectively, the drawback of such solution lies in the use of three magnetic sectors, and this affects the cost of the known system.

US2008/0114523 describes a control of a vehicle which comprises a knob associated, rotating, with a handlebar of the vehicle and suitable to be used by a rider of such vehicle to command the power generated by the engine of the latter. There is provided for a fixed sensor suitable to cooperate, contactless, with a magnetic component, preferably a permanent magnet; one of the sensor and the magnet is associated with the knob and the other to the handlebar so that it can detect the rotation of the knob and control the power of the vehicle.

US2005/0162157 describes a device for detecting the angular rotation of a component. There is provided for the use of a permanent magnet associated with a rotary shaft around an axis and operating combined with a magnetic yoke close to the magnet. The magnetic yoke is generally cylindrical, and it is required to close the magnetic field generated by the magnet; the latter is also cylindrical or oval-shaped. With the latter shape, there is generated an asymmetric magnetic flux which changes as a function of the rotation of the oval magnet. Such magnet is integrally joined with a rotary shaft and the change of the magnetic field enables a fixed sensor to detect the rotation of such shaft.

U.S. Pat. No. 4,499,420 describes a device of the disc type to detect the operating speed of an electric motor. The device uses an annular magnet associated, with a corresponding annular magnetic yoke, with a rotary shaft of the electric motor. The magnet has North and South poles, one of which has a magnetization angle greater than 180°. Furthermore, a fixed annular plate faces the magnet driven by the shaft.

Although capable of generating an asymmetric magnetic field, being obtained using cylindrical sensors, the prior art solutions indicated above are subjected to external magnetic disturbances which interfere with the detection of the rotation of the cylindrical magnetic sensor. This results in a potential imperfect and incorrect detection of the position of a knob of a motorcycle with respect to the handlebar to which the prior art solutions are applied, with ensuing imprecise control of the speed of the motorcycle.

Besides this, at least the solutions described in US2008/0114523 and US2005/0162157 are obtained with considerable and cumbersome dimensions. The solutions disclosed by US2005/0162157 and U.S. Pat. No. 4,499,420 further comprise the use of magnetic yoke, making these solutions more complex to manufacture and use.

SUMMARY OF THE INVENTION

An object of the present invention is to provide a system for precisely measuring the rotation of a throttle or accelerator knob in a motorcycle, personal watercraft or snowmobile, which is effective in detecting the intention of the rider to obtain an acceleration of the vehicle, but which—at the same time—has lower implementation costs with respect to previously known similar systems.

Another object of the invention is to provide a system of the type mentioned above which is simple to manufacture.

A further object of the invention is to provide a system of the type mentioned above that is not affected by magnetic fields or external magnetic effects, for example generated by magnetic components associated with bags which are magnetically constrained to the tank of the vehicle.

These and other objects which shall be apparent to the person skilled in the art are attained by a system according to the attached claims.

BRIEF DESCRIPTION OF THE DRAWINGS

For a better understanding of the present invention, the following drawings are attached hereto, purely by way of non-limiting example, wherein.

DETAILED DESCRIPTION OF THE INVENTION

Figure 1:
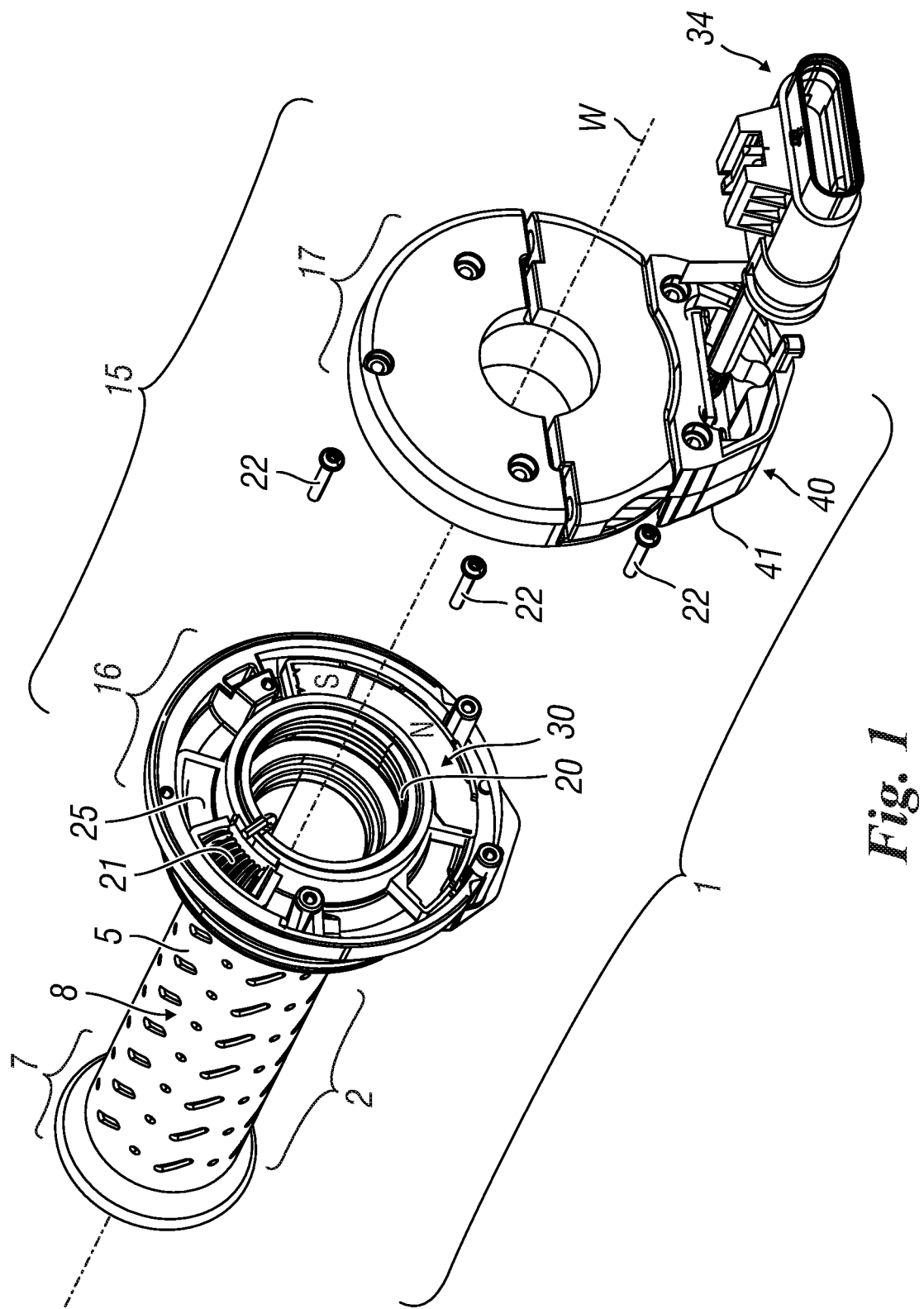
FIG. 1 shows an exploded perspective view of a knob of the system according to the invention.
Figure 2:
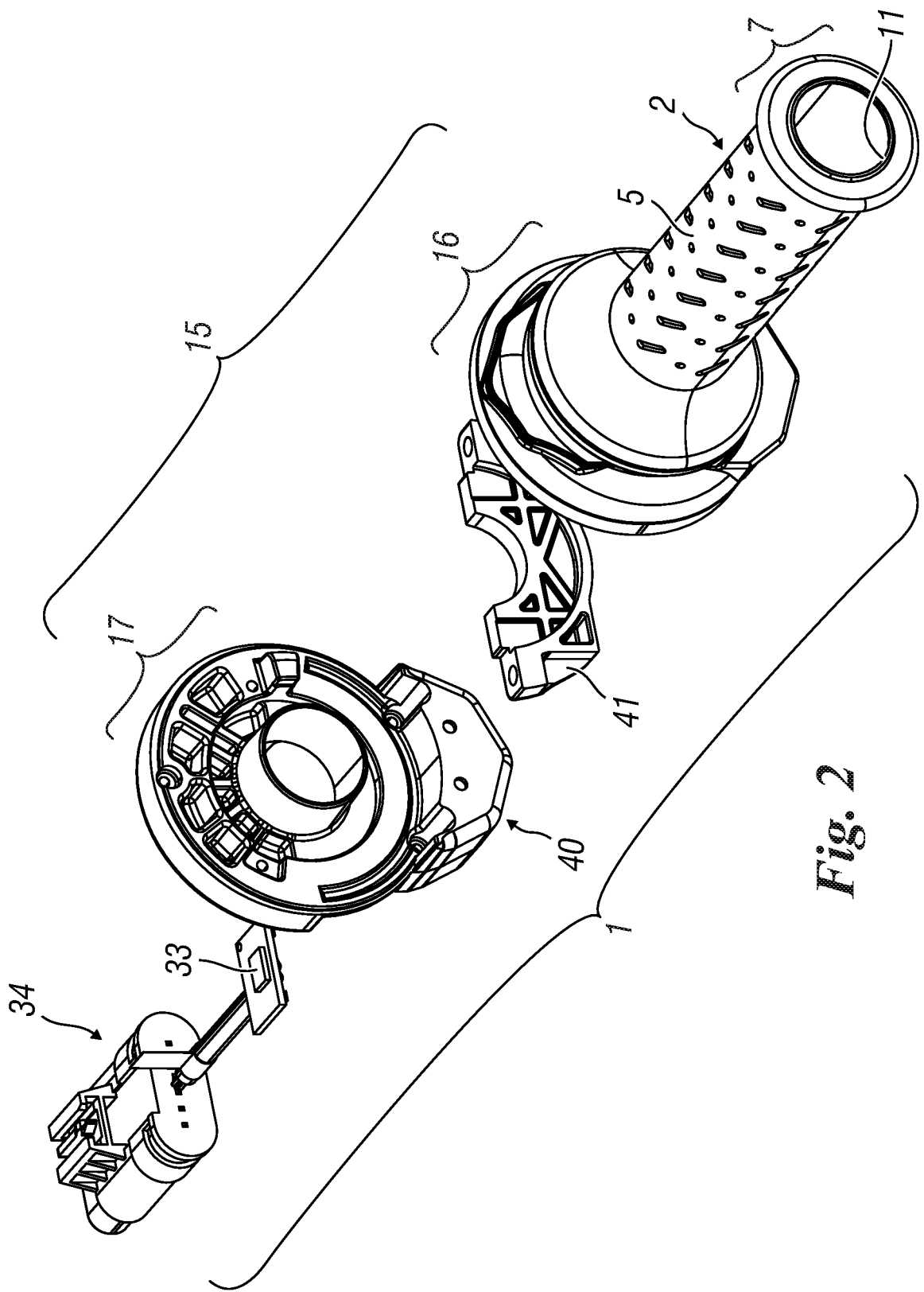
FIG. 2 shows an exploded perspective view of the knob of FIG. 1, but seen from another angle.

With reference to the aforementioned figures, they show a knob 1 suitable to be inserted into a handlebar (not shown) of a vehicle such as a motorcycle or a two or three-wheeled motorcycle, a snowmobile or a personal watercraft or even a "quad". In all these vehicles, the knob 1 is suitable to rotate (in a known manner) around a longitudinal axis W thereof on the handlebar so as to allow to control the throttle of the vehicle or change the number of engine revolutions of the latter. The knob 1 comprises a first external part 2, fitted on a second part 3; the first part 2 has a gripping portion 8 with a surface 5 obtained so as to facilitate the gripping thereof by the rider.

The first part 2 comprises a cylindrical cavity 10 in which there is inserted a cylindrical portion or shaft 11 of the second part 3 of the knob 1. Such cylindrical portion or shaft 11 has an enlarged end 12.

The knob 1 is associated with a box-like body 15 (annular) fixed to the handlebar of a motorcycle or similar vehicle and it may rotate with respect thereto. Such box-like body 15 comprises two portions 16 and 17, the first portion 16 of the box-like body being arranged at a first end of the first part 2 of the knob, whose second end 7 is enlarged outside the gripping portion 8.

Figure 3:
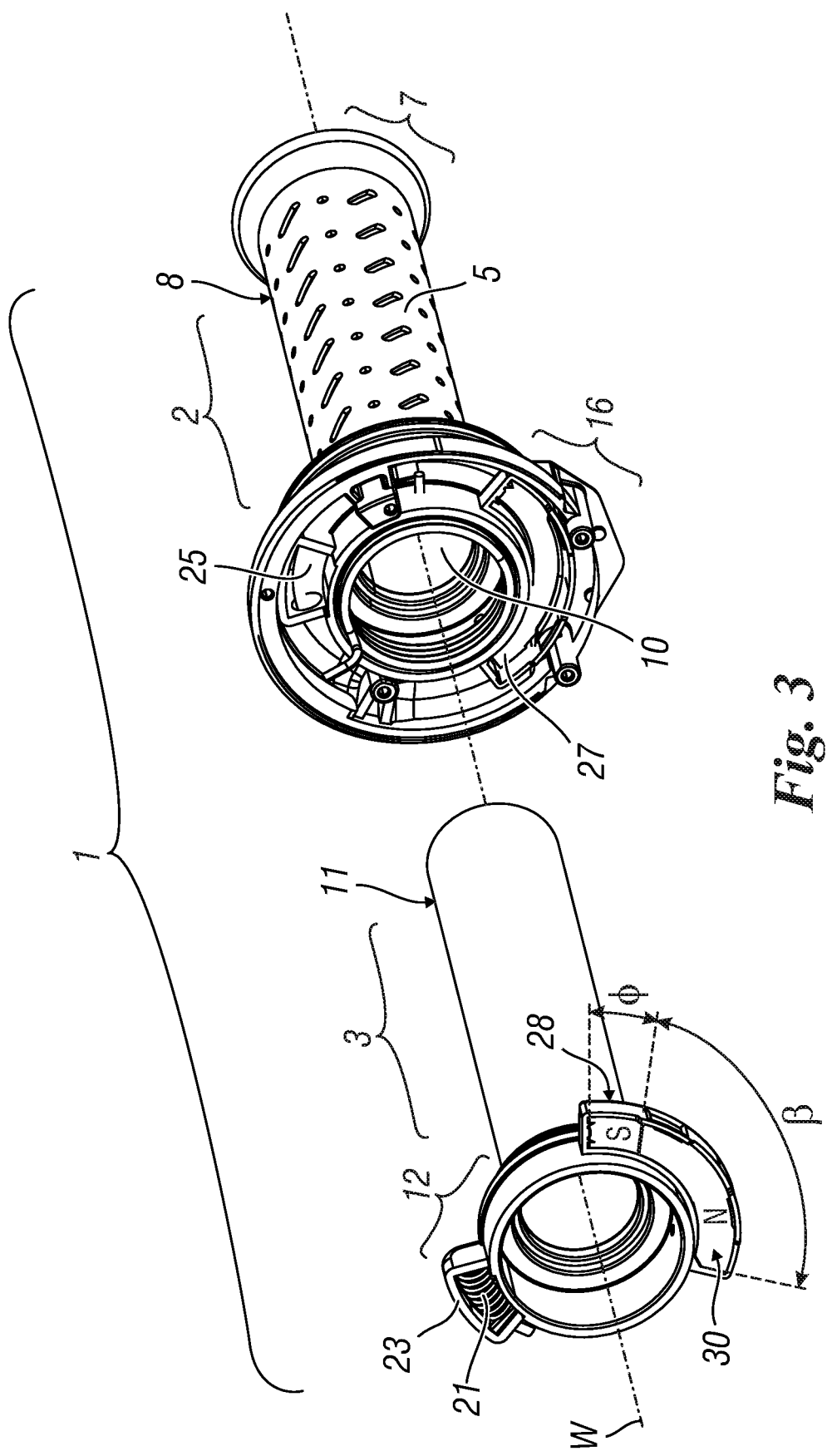
FIG. 3 shows an exploded view of two parts of the knob of the system according to the invention.

In a known manner, the first portion 16 contains at least one torsion spring 20 suitable to allow the rotation of the knob 1 (in a per se known manner and therefore not described further) around the axis W. FIG. 1 and FIG. 3 also show a second compression spring 21, which acts in a known manner upon the aforementioned rotation; such second spring may even not be provided for.

The torsion spring 20 is arranged, in a per se known manner, between the knob 1 and a seat thereof in the first portion 16 so that when the box-like body 15 is assembled, the spring generates an established preload torque and suitable to define, with the torsional compression thereof, a rotation arc of the knob and therefore allow the predefined change, within a fixed range, from the number of revolutions allowed to the engine.

The two portions 16 and 17 of the body 15 are fixed to each other by means of screws 22 and they are enclosed onto each other so as to keep the end 12 of the cylindrical portion or shaft 11 in the first portion 16 mentioned above. In particular, the end 12 of such shaft 11 has a seat 23 in which there is arranged the compression spring 21 suitable to movably penetrate into a recess 25 of the portion 16.

A second recess 27 of such portion 16 contains a seat 28 for a permanent magnet 30 integrally joined with the second part 3 of the knob and provided for in the enlarged end 12 of the latter and protruding laterally therefrom. Such magnet 30 is circular-segment shaped and it has the North and South (N and S) polarities only; the latter have dimensions different from each other, so that the magnet 30 has an asymmetric shape in its poles. The recess 27 of the portion 16 has a length greater than that of the seat 28 so as to allow the displacement of the latter (and of the magnet 30 contained therein) in the recess 27 when the knob is rotated to change the number of engine revolutions (that is accelerate the vehicle).

The seat 28, the respective magnet 30 and obviously the recess 27, are arranged with median axes lying along arched lines (that is shaped with arched circle segments, and that is a circular crown portion). The angle α subtended by such arc, that is the amplitude of the latter is equal to about 100°-110°; the polarity part N, in the overall rotation arc of the knob, has an amplitude defined by an angle β comprised between 65° and 75°, preferably equal to 70°, the one with polarity S has amplitude defined by an angle Φ with value comprised between 35° and 45°, preferably equal to 40°.

The circular segment magnet 30 (which could be defined as with two sectors, N and S) is suitable to cooperate with a Hall effect sensor 33 (that is suitable to detect the magnetic field or flux generated by the permanent magnet 30 or by the sectors or polarities thereof) associated with electronics or circuitry 34 thereof integrally joined with the second portion 17 of the body 15 fixed to the handlebar of the bicycle.

There is not provided for any magnetic yoke and the sensor 33 directly cooperates with the circular segment magnet 30 directly detecting the magnetic field generated by it.

The circuitry 34 cooperates with a control unit or electronic control unit of the vehicle (not shown) suitable to control a usual component useful to change the number of engine revolutions (or accumulate such motor) as a function of the rotation angle or angular position of the circular segment magnet 30 detected by the sensor 33.

It should be observed that, despite the circular segment magnet 30 having a dimension equal to a total arch of about 110°, the Hall effect sensor 33 detects a rotation of the magnet within an arc comprised between 55° and 90° and preferably between 55° and 75°, usual maximum operating angular range of a motorcycle accelerator that is the usual angular range in which a throttle control knob of a vehicle rotates at most (between 0° and 55°-75°).

Figure 4:
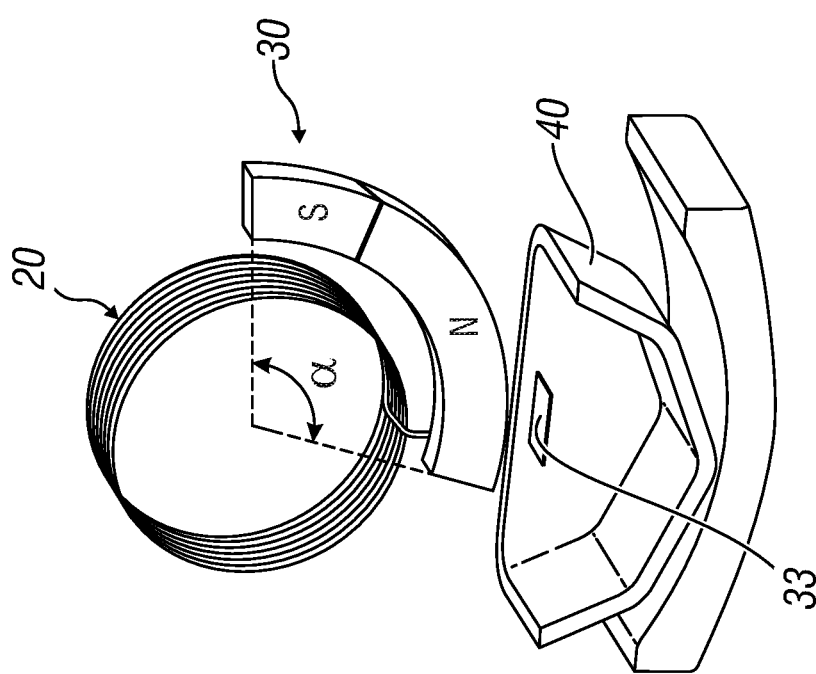
FIG. 4 shows a schematic view of a part of the system according to the invention.

The sensor 33 is housed in a chamber 40 provided for in the portion 17 of the body 15 and enclosed by "its own" lid 41 constrained to the portion 17 using usual screws (not shown). Such chamber is positioned under the magnet 30, also as schematically shown in FIG. 4, so that the sensor 33 contained therein is capable of detecting the polarity of the magnet which faces towards such sensor and the angular movement thereof.

Therefore, the invention uses only one circular segment permanent magnet 30 having two magnetic sectors (defined by the poles N and S of the magnet) so as to determine the angular rotation of the throttle knob 1 and the degree (that is the angular value) of such rotation. The magnet 30 is arranged substantially around the rotation axis W of the knob 1 and the sensor 33 detects—in a known manner—said rotation and the displacement of the magnet from an initial position (which may be an inoperative position of the knob or a position already rotated with respect to the inoperative one) to a final position and generates a corresponding electric signal that the electronics 34 send to the control unit of the motor. The latter acts in a per se known manner on the engine so as to change the number of revolutions thereof.

The fact that the magnet has a specific shape and only two "magnetic" sectors, asymmetric to each other, allows it to avoid disturbances in the detection thereof, even in the presence of possible external magnetic fields (such as, for example, those generated by supports for bags to be applied to the tank of the motorcycle). As a matter of fact, in this case, the possible presence of an external magnetic field (generating a disturbance on the Hall effect sensor 33), with any position/rotation of the knob would lead to a vector of the resulting magnetic field which does not change the angulation thereof in the space with respect to a reference. Such effect is reduced and easily compensated by the control unit functionally connected to the aforementioned sensor.

In particular, the aforementioned disturbances in the detection of the position of the magnet 30 are optimally attenuated in the entire rotation range of the knob, for example between 0° and 75°. This is specifically due to the conformation of the magnet 30 and to the asymmetry thereof in the polarities.

Additionally, the circular segment shape of the magnet 30 and the absence of magnetic yokes associated with the magnet or with the knob allows it to obtain a system for detecting the rotation of such small knob.

On the contrary, this does not happen when using a three sector-sensor of the prior art where—in the situation indicated above—the vector of the resulting magnetic field changes the angle thereof when the knob passes from an initial non-rotated position to the maximum rotation position with ensuing significant change of the signal detected by the Hall effect sensor and linked to the movement of the three-sector sensor.

Such change requires a significant action of the control unit to compensate for such disturbance, and therefore the known solution needs a greater complexity of the algorithm based on which such control unit operates.

The advantages of the present invention cannot even be obtained with the known systems provided with only one cylindrical or oval magnet given that they do not have the shape of the magnet 30.

In addition, the use of a magnet with only two asymmetric sectors associated with a knob as described herein allows one to reduce the costs of the detection system having the knob 1 and the elements functionally connected thereto.

The invention claimed is:

1. A system for measuring the rotation of a throttle knob of a vehicle such as a motorcycle, a snowmobile, a personal watercraft or the like, said knob being associated with a vehicle handlebar and being rotary around a longitudinal axis (W) thereof, such rotation occurring at a fixed body, the knob carrying a permanent magnet rotating with the knob, the angular position of the permanent magnet being detected by a sensor integrally joined with said fixed body and suitable to detect the magnetic flux generated by said permanent magnet, said magnet comprising two sectors (N, S) defined by the opposite polarities thereof, said sectors (N, S) having dimensions different from each other so that the magnet has asymmetric polarities, wherein said permanent magnet has an arched circular segment shape, and is arranged at a side of the longitudinal axis (W) of the knob; and wherein in a rotation arc of the knob around the longitudinal axis (W) thereof, a first polarity (N) of said circular segment magnet has an amplitude of between 65° and 75° and the second polarity (S) has an amplitude of between 35° and 45°.

2. The system according to claim 1, wherein said permanent magnet is arch-shaped with amplitude of between 100° and 110°.

3. The system according to claim 1, wherein said sensor is a Hall effect sensor, said sensor being associated with electronics or circuitry thereof connected to a control unit of the engine of the vehicle.

4. The system according to claim 1, wherein said sensor detects a rotation of the magnet within an arc of between 55° and 90°.

5. The system according to claim 1, wherein the knob is associated with an annular box-like body fixed to the handlebar of the vehicle and rotates with respect to the annular box-like body, the annular box-like body comprising a portion having a recess suitable to contain, movable, a seat for the circular segment permanent magnet protruding laterally from the knob.

6. The system according to claim 5, wherein said seat for the permanent magnet is associated with a part of the knob inserted into a different part of the knob provided with gripping portion by a rider.

7. The system according to claim 1, wherein the first polarity (N) of said circular segment magnet has an amplitude equal to 70°.

8. The system according to claim 1, wherein the second polarity (S) of said circular segment magnet has amplitude equal to 40°.

* * * * *